United States Patent
Horiguchi et al.

(10) Patent No.: US 7,537,348 B2
(45) Date of Patent: May 26, 2009

(54) PROJECTION TYPE VIDEO DISPLAY

(75) Inventors: Hirotake Horiguchi, Osaka (JP); Takeshi Higashino, Kyoto (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 637 days.

(21) Appl. No.: 11/234,124

(22) Filed: Sep. 26, 2005

(65) Prior Publication Data

US 2006/0067049 A1    Mar. 30, 2006

(30) Foreign Application Priority Data

Sep. 27, 2004    (JP)    ............... 2004-278742

(51) Int. Cl.
*G03B 21/16*    (2006.01)
(52) U.S. Cl. .......................... 353/52; 353/57
(58) Field of Classification Search ................... 353/52, 353/57–61; 348/748
See application file for complete search history.

(56) References Cited

U.S. PATENT DOCUMENTS

| | | | |
|---|---|---|---|
| 6,322,218 B1 * | 11/2001 | Sugawara et al. ............. | 353/52 |
| 7,086,739 B2 * | 8/2006 | Kida et al. .................... | 353/52 |
| 7,237,904 B2 * | 7/2007 | Hsu et al. ..................... | 353/52 |
| 7,331,677 B2 * | 2/2008 | Horiguchi et al. ............ | 353/57 |
| 2006/0065125 A1 * | 3/2006 | Horiguchi et al. ............ | 96/419 |

FOREIGN PATENT DOCUMENTS

| | | |
|---|---|---|
| JP | 2000-153121 A | 6/2000 |
| JP | 2000-194072 A | 7/2000 |
| JP | 2001-209125 A | 8/2001 |
| JP | 2001-222065 | 8/2001 |
| JP | 2002-62589 A | 2/2002 |
| JP | 2002-258237 A | 9/2002 |
| JP | 2003-005147 A | 1/2003 |

OTHER PUBLICATIONS

Office Action dated Dec. 12, 2006 issued in the corresponding Japanese Application No. 2004-278742.
European Search Report dated Dec. 21, 2005, issued in corresponding European Patent Application No. 05020842.

* cited by examiner

*Primary Examiner*—William C Dowling
(74) *Attorney, Agent, or Firm*—Westerman, Hattori, Daniels & Adrian, LLP.

(57) ABSTRACT

Barometric-pressure data that a barometric pressure sensor outputs, and an air volume data that an air-volume sensor outputs are input into a system control circuit. The system control circuit is provided with a table storing portion. In the table storing portion, a control table is stored. The control table defines a voltage value to be added to a fan power supply set by a barometric-pressure value and an air-volume value. The voltage value to be added is voltage added to a normally set voltage value, and is set within a range from 0 (zero) V (volt) to 6 V, for example. The normally set voltage value is voltage set based on temperature detected by a temperature sensor, for example. In this case, the voltage value to be added is applied to voltage that is determined by the outside temperature and applied to the fan power supply.

10 Claims, 3 Drawing Sheets

FIG. 3

| BAROMETRIC PRESSURE (hPa) | AIR VOLUME (m³/s) / AIR VOLUME SENSOR OUTPUTTING VALUE (V) | | | | | |
|---|---|---|---|---|---|---|
| | 3.33~2.51 / 5~4 | 2.50~2.20 / 4~3.5 | 2.19~2.06 / 3.5~3.1 | 2.05~1.91 / 3.1~2.9 | 1.90~1.66 / 2.9~2.6 | 1.65~ / 2.6~ |
| 1013~967 | 0 | 1 | 2 | 3 | 5 | warning |
| 966~900 | 1 | 2 | 3 | 4 | 6 | warning |
| 899~834 | 2 | 3 | 4 | 5 | warning | warning |
| 833~767 | 3 | 4 | 5 | warning | warning | warning |
| 766~679 | 4 | 5 | warning | warning | warning | warning |
| 678~ | 5 | warning | warning | warning | warning | warning |

PROJECTION TYPE VIDEO DISPLAY

TECHNICAL FIELD

The present invention relates to a projection type video display such as a liquid crystal projector, etc.

BACKGROUND ART

Because of a configuration in which light emitted from a light source is modulated by a light valve such as a liquid crystal panel, etc., and the modulated light is projected, a projection type video display needs to be provided with a high-intensity light source. For this, it is needed to prepare measures against heat generated from the high-intensity light source itself, or heat generated at a time that the light is absorbed by a polarizer of a liquid crystal panel or various kinds of optical components. From the past, an intake and exhaust are performed by rotating a cooling fan by a motor so as to release the heat to outside the video display (see Japanese Patent Laying-open No. 2001-222065).

Incidentally, in order to take in outside air into the video display for cooling, a filter is provided at an air-intake port for removing a dust in the outside air, and if this filter is clogged, an appropriate cooling control cannot be realized.

SUMMARY OF THE INVENTION

In view of the above circumstances, it is an object of the present invention to provide a projection type video display capable of performing a cooling control as appropriate as possible even in a case that a filter is clogged.

In order to solve the above-described problem, a projection type video display according to the present invention is a projection type video display for applying an optical modulation to light emitted from a light source by a light valve, and projecting image light obtained by this optical modulation, and comprises an air-cooling means for cooling inside the display by air, a filter provided at an outside-air intake port, an air-volume sensor for detecting a volume of air drawn from the outside-air intake port, a table on which a control content determined based on an air-volume value is defined, and a control means for controlling a cooling power of the air-cooling means by obtaining the control content from the table based on air volume data from the air-volume sensor (Hereinafter, referred to as a first configuration in this section).

In the above first configuration, how far the filter is clogged (an extent of clogging) appears in the air-volume data from the air-volume sensor. The control means controls a cooling power of the air-cooling means by the control content based on the air-volume data, so that even in a case that the filter is clogged, the control means is capable of performing a cooling control as appropriate as possible.

In addition, a projection type video display according to the present invention is a projection type video display for applying an optical modulation to light emitted from a light source by a light valve, and projecting image light obtained by this optical modulation, and comprises an air-cooling means for cooling inside the device by air, a filter provided at an outside-air intake port, an air-volume sensor for detecting a volume of air taken in from the outside-air intake port, a barometric sensor for detecting a barometric pressure, a table on which a control content determined by an air volume value and a barometric-pressure value is defined, and a control means for controlling a cooling power of the air-cooling means by obtaining the control content from the table based on air volume data from the air-volume sensor and barometric-pressure data from the barometric pressure sensor (Hereinafter, referred to as a second configuration in this section).

In the above second configuration, how far the filter is clogged (an extent of clogging) appears in the air-volume data from the air-volume sensor. The control means controls a cooling power of the air-cooling means by the control content based on the air-volume data, so that even in a case that the filter is clogged, the control means is capable of performing a cooling control as appropriate as possible.

A projection type video display according to the first configuration may comprise a temperature sensor for detecting outside temperature, and a table on which the control content of the air-cooling means determined by temperature is defined, in which the control means may obtain the control content from the table based on temperature data from the temperature sensor, and may control the air-cooling means based on the control content in which the control content based on the air volume data is the control content based on the temperature data.

A projection type video display according to the second configuration may comprise a temperature sensor for detecting outside temperature, and a table on which the control content of the air-cooling means is defined by temperature, in which the control means may obtain the control content from the table based on temperature data from the temperature sensor, and may control the air-cooling means based on a control content in which the control content based on the air volume data and barometric-pressure data are the control content based on the temperature data.

In the projection type video display of these configurations, the table may be formed of a normal mode-use table, and an economy mode-use table. In addition, the table may be formed of at least a table for a time of driving the light source by first electric power, and a table for a time of driving the light source by second electric power. Furthermore, a projection type video display may comprise a plurality of light sources as the light source, in which the table is formed of at least a table for a time that all the light sources are turned on, and a table for a time that one or a few light sources are turned on.

According to the present invention, even in a case that the filter is clogged, it is possible to perform a cooling control as appropriate as possible.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a descriptive diagram showing contents of a table stored in a liquid crystal projector of an embodiment of the present invention stores.

BEST MODE FOR PRACTICING THE INVENTION

Hereinafter, a liquid crystal projector of an embodiment of the present invention will be described based on FIG. 1 to FIG. 3.

Figure 1:
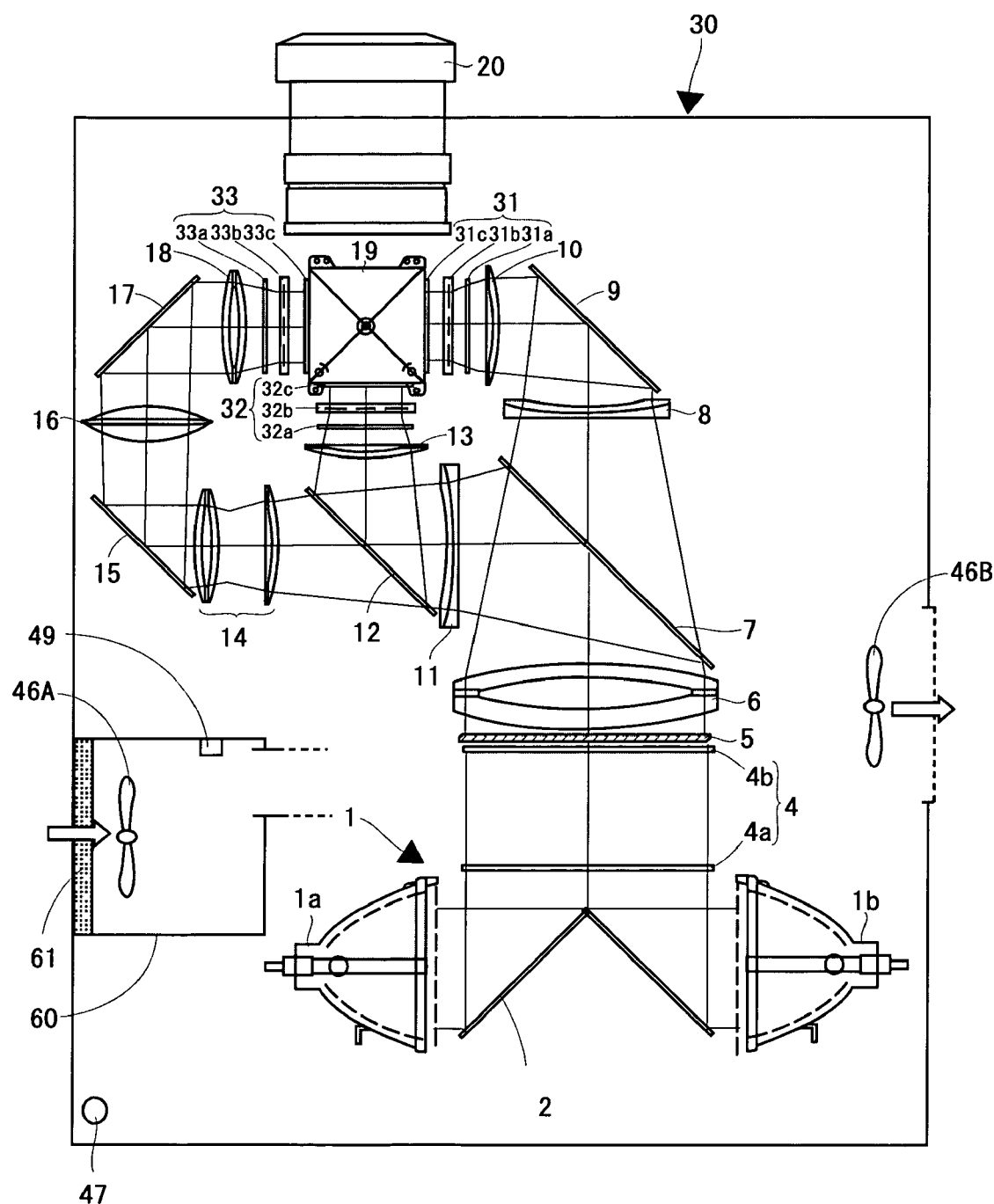
FIG. 1 is a structural view showing an optical system, etc., of a liquid crystal projector of an embodiment of the present invention.

FIG. 1 is a diagram showing an optical system of a liquid crystal projector 30, etc., of this embodiment. An illuminating device 1 is formed of a first lamp 1a, a second lamp 1b, and mirrors 2 arranged between the lamps 1a, 1b. Each lamp is formed of an ultra-high pressure mercury lamp, a metal halide lamp, a xenon lamp, etc., and light emitted from each lamp is converted into collimated light by a parabolic reflector. Then, the light is guided to an integrator lens 4.

The integrator lens 4 is constituted of a pair of fly's eye lenses 4a, 4b, and each pair of the lenses introduces light emitted from the illuminating device 1 to an entire surface of a liquid crystal display panel described later. In addition, the integrator lens 4 evens off partial luminance non-uniformity existing in the illuminating device 1, and decreases a difference between a light amount in a screen (panel) center and that on a peripheral side. The light that passes through the integrator lens 4 passes through a polarization conversion system 5 and a condenser lens 6, and thereafter, is introduced to a first dichroic mirror 7.

The polarization conversion system 5 is constituted of a polarization beam splitter array (Hereinafter, referred to as a PBS array). The PBS array is provided with a polarized light separating surface, and a retardation plate (½ λplate). Each polarized light separating surface of the PBS array transmits P-polarized light, for example, out of light from the integrator lens 4, and changes an optical path of S-polarized light by 90 degrees. The S-polarized light having the optical path changed is reflected by an adjacent polarized light separating surface, and is directly exited therefrom. On the other hand, the P-polarized light that passed through the polarized light separating surface is converted into the S-polarized light by the retardation plate provided on a front side (light-exit side) of the polarized light separating surface, and is exited therefrom. That is, in this case, approximately all light is converted into the S-polarized light.

The first dichroic mirror 7 transmits light in a red wavelength band, and reflects light in a cyan (green+blue) wavelength band. The light in a red wavelength band passing through the first dichroic mirror 7 enters a concave lens 8, and is reflected by a reflection mirror 9. As a result, an optical path is changed. The light of red color reflected by the reflection mirror 9 enters a lens 10, and passes through a red color-use transmission-type liquid crystal display panel 31. As a result of passing therethrough, the light of red color is optically modulated. On the other hand, light in a cyan wavelength band reflected by the first dichroic mirror 7 enters a concave lens 11, and thereafter, is introduced to a second dichroic mirror 12.

The second dichroic mirror 12 transmits light in a blue wavelength band, and reflects light in a green wavelength band. The light in a green wavelength band reflected by the second dichroic mirror 12 enters a lens 13, and thereafter, is introduced to a green color-use transmission-type liquid crystal display panel 32. As a result of passing therethrough, the light in a green wavelength band is optically modulated. In addition, the light in a blue wavelength band passing through the second dichroic mirror 12 enters a relay lens 14, a reflection mirror 15, a relay lens 16, a reflection mirror 17 and a relay lens 18, and thereafter, is introduced to a blue color-use transmission-type liquid crystal display panel 33. As a result of passing therethrough, the light in a blue wavelength band is optically modulated.

Each liquid crystal display panel 31, 32, or 33 is formed of being provided with incidence-side polarizers 31a, 32a, and 33a, panel portions 31b, 32b, and 33b formed by sealing liquid crystal between a pair of glass plates (on which a pixel electrode and an alignment film are formed), and exit-side polarizers 31c, 32c, and 33c.

The modulated light (image light of respective colors) modulated by passing through the liquid crystal display panels 31, 32, and 33 is combined by a cross dichroic prism 19, and as a result, is changed to full-color image light. This full-color image light is projected by a projection lens 20, and displayed on a screen not shown.

A duct 60 is arranged inside a main body of the liquid crystal projector 30. The duct 60 is connected to an air-intake port formed on a side surface of the main body, for example. In addition, at the air-intake port, a filter 61 for removing dust in outside air is mounted. Furthermore, inside the duct 60, an intake fan 46A is provided, so that the outside air is drawn inside the main body. The drawn outside air passes through the duct 60, and is blown onto an object (the lamp, the liquid crystal display panel, etc.) to be cooled.

Inside the duct 60, an air-volume sensor (air-current amount sensor) 49 is provided. For the air-volume sensor 49, a Coriolis mass current-velocity sensor, a swirl-type air-current amount sensor, a sensor for detecting an air current amount by measuring a temperature distribution changing depending on a current of winds or air, etc., may be used. Furthermore, a barometric pressure sensor 47 (see FIG. 2, too) is provided on an outside of the duct 60, which is within the main body of the liquid crystal projector 30. For the barometric pressure sensor 47, a sensor using a semiconductor pressure-sensitive element may be adopted, for example.

Furthermore, on a side surface, for example, of the main body of the liquid crystal projector 30, an exhaust port is provided, and in the vicinity of this exhaust port, an exhaust fan 46B is provided. The exhaust fan 46B exhausts air inside the main body of the liquid crystal projector 30 to outside the main body.

Figure 2:
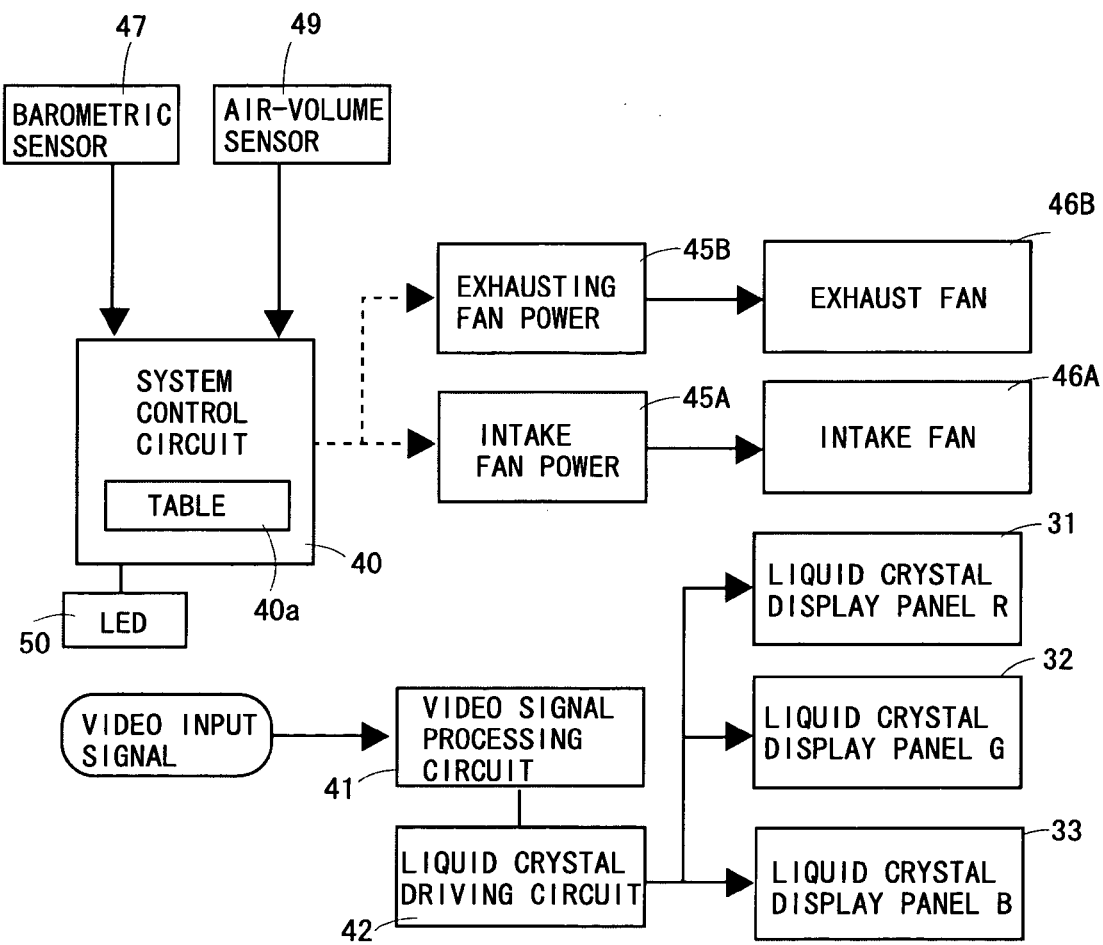
FIG. 2 is a block chart showing a fan control system of a liquid crystal projector of an embodiment of the present invention.

FIG. 2 is a block chart showing a video process system and a fan control system in the liquid crystal projector 30. A video signal processing circuit 41 inputs a video signal, and subjects the input signal to a frequency conversion (conversion of the number of scanning lines), a gamma correction process in view of added voltage—light-transmissible characteristic of the liquid crystal display panel, and other processes, and applies this corrected video signal (video data) to the liquid crystal driving circuit 42. The liquid crystal driving circuit 42 drives the liquid crystal display panels 31, 32, and 33 based on the video signal. A system control circuit 40 controls operations of an intake fan power supply 45A, an exhaust fan power supply 45B, etc. The intake fan power supply 45A supplies electric power to the intake fan 46A. The exhaust fan power supply 45B supplies electric power to the exhaust fan 46B.

Barometric-pressure data that the barometric pressure sensor 47 outputs is input into the system control circuit 40, and air-volume data that the air-volume sensor 49 outputs, too, is input into the system control circuit 40. The system control circuit 40 is provided with a table storing portion (a memory) 40a. In the table storing portion 40a, a control table shown in FIG. 3 is stored. The control table defines a voltage value to be added to the fan power supply set by a barometric-pressure value and an air-volume value. The voltage value to be added is voltage added to a normally set voltage value, and in this embodiment, is set within a range from 0 (zero) V (volt) to 6 V. The normally set voltage value is fan driving voltage readout from a table not shown based on temperature detected by a temperature sensor not shown, for example. In this case, the voltage value to be added is applied to a voltage value that is determined by the outside temperature and supplied to the fan power supply.

If the air-volume data (voltage value) of the air-volume sensor 49 is low, this indicates that the filter 61 is clogged, and thus, a current of the air inside the duct 60 becomes weak. In addition, if the barometric pressure is low, this indicates that although the speed of rotations of the fans is the same, a force of air becomes weak because the air becomes thin. That is, the lower the air volume and the barometric pressure, the larger the voltage value to be added is set. In a case of the control table illustrated in FIG. 3 as an example, if the air volume is from 1.90 m$^3$/s to 1.66 m$^3$/s, and the barometric-pressure value is from 966 hPa (hectopascals) to 900 hPa, for example, 6 V are added to the normally set voltage value. The system control circuit 40 supplies to the control table measured air-volume data and barometric-pressure data (both are digital data) as a reading-out address. Then, the voltage value to be added to the fan power supply is read out from the control table. The system control circuit 40 drives the fan based on the voltage value in which the voltage value to be added is applied to the normally set voltage value.

Furthermore, in this embodiment, in a range considered to be not capable of performing a sufficient cooling because both the air volume and the barometric pressure are very low (in areas in which a "warning" is written on the control table in FIG. 3), the system control circuit 40 is to issue a warning. The warning is issued by turning on or blinking a LED 50 provided on an operating panel (not shown), for example. It is, of course, possible to exhibit a warning display on a message-use display panel, or to issue a warning sound by a buzzer, etc.

The control table may be formed of at least a table for a time of driving a light source by first power supply (300 W (Watt)), for example), and a table for a time of driving a light source by second power supply (240 W, for example). Needless to say, the control table may be formed of the table for a time of driving a light source by first power supply, the table for a time of driving a light source by second power supply, and a table for a time of driving a light source by first power supply. In addition, the table may be formed of at least a table for a time that all lamps are turned on (a table used in a case that four lamps, out of the four lamps, are turned on, or a table used in a case that two lamps, out of the two lamps, are turned on, for example), and a table for a time that one or a few lamps are turned on (a table used in a case that two lamps, out of four lamps, are turned on, or a table used in a case that one lamp, out of two lamps, is turned on, for example).

It is noted that in the above-described embodiment, a three-panel liquid crystal projector using the liquid crystal display panel is shown. However, the present invention is applicable to a liquid crystal projector provided with another image light generating system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type video display for applying an optical modulation to light emitted from a light source by a light valve, and projecting image light obtained by this optical modulation, comprising:
   an air-cooling means for cooling inside the device by air;
   a filter provided at an outside-air intake port;
   an air-volume sensor for detecting a volume of air drawn from the outside-air intake port;
   a table on which a control content determined by an air volume value is defined; and
   a control means for controlling a cooling power of the air-cooling means by obtaining the control content from the table based on air volume data from the air-volume sensor.

2. A projection type video display for applying an optical modulation to light emitted from a light source by a light valve, and projecting image light obtained by this optical modulation, comprising:
   an air-cooling means for cooling inside the device by air;
   a filter provided at an outside-air intake port;
   an air-volume sensor for detecting a volume of air drawn from the outside-air intake port;
   a barometric sensor for detecting a barometric pressure;
   a table on which a control content determined by an air volume value and a barometric-pressure value is defined; and
   a control means for controlling a cooling power of the air-cooling means by obtaining the control content from the table based on air volume data from the air-volume sensor and barometric-pressure data from the barometric pressure sensor.

3. A projection type video display, according to claim 1, comprising:
   a temperature sensor for detecting outside temperature; and
   a table on which the control content of the air-cooling means determined by temperature is defined, wherein the control means obtains the control content from the table based on temperature data from the temperature sensor, and controls the air-cooling means based on a control content in which the control content based on the air volume data is the control content based on the temperature data.

4. A projection type video display, according to claim 2, comprising:
   a temperature sensor for detecting outside temperature;
   a table on which the control content of the air-cooling means determined by temperature is defined, wherein the control means obtains the control content from the table based on temperature data from the temperature sensor, and controls the air-cooling means based on a control content in which the control content based on the air volume data and barometric-pressure data are the control content based on the temperature data.

5. A projection type video display for applying an optical modulation to light emitted from a light source by a light valve, and projecting image light obtained by this optical modulation, comprising:
   an air-cooling means for cooling inside the device by air;
   a filter provided at an outside-air intake port;
   an air-volume sensor for detecting a volume of air drawn from the outside-air intake port;
   a table on which a control content determined by an air volume value is defined; and
   a control means for controlling a cooling power of the air-cooling means by obtaining the control content from the table based on air volume data from the air-volume sensor,
   wherein the table is formed of a normal mode-use table, and an economy mode-use table.

6. A projection type video display for applying an optical modulation to light emitted from a light source by a light valve, and projecting image light obtained by this optical modulation, comprising:
   an air-cooling means for cooling inside the device by air;
   a filter provided at an outside-air intake port;

an air-volume sensor for detecting a volume of air drawn from the outside-air intake port;
a barometric sensor for detecting a barometric pressure;
a table on which a control content determined by an air volume value and a barometric-pressure value is defined; and
a control means for controlling a cooling power of the air-cooling means by obtaining the control content from the table based on air volume data from the air-volume sensor and barometric-pressure data from the barometric pressure sensor,
wherein the table is formed of a normal mode-use table, and an economy mode-use table.

7. A projection type video display for applying an optical modulation to light emitted from a light source by a light valve, and projecting image light obtained by this optical modulation, comprising:
an air-cooling means for cooling inside the device by air;
a filter provided at an outside-air intake port;
an air-volume sensor for detecting a volume of air drawn from the outside-air intake port;
a table on which a control content determined by an air volume value is defined; and
a control means for controlling a cooling power of the air-cooling means by obtaining the control content from the table based on air volume data from the air-volume sensor,
wherein the table is formed of at least a table for a time of driving the light source by first power supply, and a table for a time of driving the light source by second power supply.

8. A projection type video display for applying an optical modulation to light emitted from a light source by a light valve, and projecting image light obtained by this optical modulation, comprising:
an air-cooling means for cooling inside the device by air;
a filter provided at an outside-air intake port;
an air-volume sensor for detecting a volume of air drawn from the outside-air intake port;
a barometric sensor for detecting a barometric pressure;
a table on which a control content determined by an air volume value and a barometric-pressure value is defined; and
a control means for controlling a cooling power of the air-cooling means by obtaining the control content from the table based on air volume data from the air-volume sensor and barometric-pressure data from the barometric pressure sensor,
wherein the table is formed of at least a table for a time of driving the light source by first power supply, and a table for a time of driving the light source by second power supply.

9. A projection type video display for applying an optical modulation to light emitted from a light source by a light valve, and projecting image light obtained by this optical modulation, comprising:
an air-cooling means for cooling inside the device by air;
a filter provided at an outside-air intake port;
an air-volume sensor for detecting a volume of air drawn from the outside-air intake port;
a table on which a control content determined by an air volume value is defined; and
a control means for controlling a cooling power of the air-cooling means by obtaining the control content from the table based on air volume data from the air-volume sensor,
wherein
the light source is a plurality of light sources, and
the table is formed of at least a table for a time that all the light sources are turned on, and a table for a time that one or a few light sources are turned on.

10. A projection type video display for applying an optical modulation to light emitted from a light source by a light valve, and projecting image light obtained by this optical modulation, comprising:
an air-cooling means for cooling inside the device by air;
a filter provided at an outside-air intake port;
an air-volume sensor for detecting a volume of air drawn from the outside-air intake port;
a barometric sensor for detecting a barometric pressure;
a table on which a control content determined by an air volume value and a barometric-pressure value is defined; and
a control means for controlling a cooling power of the air-cooling means by obtaining the control content from the table based on air volume data from the air-volume sensor and barometric-pressure data from the barometric pressure sensor,
wherein
the light source is a plurality of light sources, and
the table is formed of at least a table for a time that all the light sources are turned on, and a table for a time that one or a few light sources are turned on.

* * * * *